United States Patent [19]
Itoh et al.

[11] Patent Number: 5,784,687
[45] Date of Patent: Jul. 21, 1998

[54] TRANSMITTING-RECEIVING CIRCUIT FOR RADIOCOMMUNICATION APPARATUS, SEMICONDUCTOR INTEGRATED CIRCUIT DEVICE INCLUDING THE CIRCUIT, AND RADIOCOMMUNICATION APPARATUS INCLUDING THE SAME

[75] Inventors: Junji Itoh; Kazuhisa Fujimoto, both of Osaka, Japan

[73] Assignee: Matsushita Electric Industrial Co., Ltd., Osaka, Japan

[21] Appl. No.: 520,676

[22] Filed: Aug. 29, 1995

[30] Foreign Application Priority Data

Aug. 30, 1994 [JP] Japan ................... 6-20573
Mar. 9, 1995 [JP] Japan ................... 7-049474

[51] Int. Cl.[6] ........................................ H04B 1/48
[52] U.S. Cl. ..................... 455/78; 455/82; 455/83; 333/103; 333/126
[58] Field of Search ................... 455/78, 80, 82, 455/83, 84, 89, 90, 129; 333/101, 103, 104, 118, 124, 126, 132

[56] References Cited

U.S. PATENT DOCUMENTS

| | | | |
|---|---|---|---|
| 4,055,807 | 10/1977 | Priniski et al. | 455/83 |
| 4,764,726 | 8/1988 | Misic et al. | 455/83 |
| 4,973,940 | 11/1990 | Sakai et al. | 333/101 |
| 5,054,114 | 10/1991 | Erickson | 455/78 |
| 5,375,256 | 12/1994 | Yokoyama et al. | 455/83 |

FOREIGN PATENT DOCUMENTS 0 578 160   1/1994   European Pat. Off.
WO 92/22937 12/1992  WIPO.

OTHER PUBLICATIONS

Muraguchi et al., "1.9 Ghz–Band Low Voltage and Low Power Consumption RF IC Chip-Set for Personal Communications". Proceedings of IEEE Vehicular Technology Conference, Jun. 8–10, 1994.

*Primary Examiner*—Reinhard J. Eisenzopf
*Assistant Examiner*—Thanh Le
*Attorney, Agent, or Firm*—McDermott, Will & Emery

[57] ABSTRACT

A changeover switch switches connection between an antenna and a transmitter amplifier and connection between the antenna and a receiver low noise amplifier, from one to the other. A first wire having characteristic impedance of 50 Ω connects the antenna and the changeover switch. A receiver matching circuit matches input impedance of the receiver low noise amplifier with the output impedance of the transmitter amplifier. An antenna side matching circuit matches the input impedance of the receiver low noise amplifier, which is matched with the output impedance of the transmitter amplifier by the receiver matching circuit, and the output impedance of the transmitter amplifier with the characteristic impedance of the first wire. The transmitter amplifier is connected with the changeover switch via a first coupling capacitance, and the receiver matching circuit is connected with the changeover switch via a second coupling capacitance.

8 Claims, 8 Drawing Sheets

F I G.1 (b)
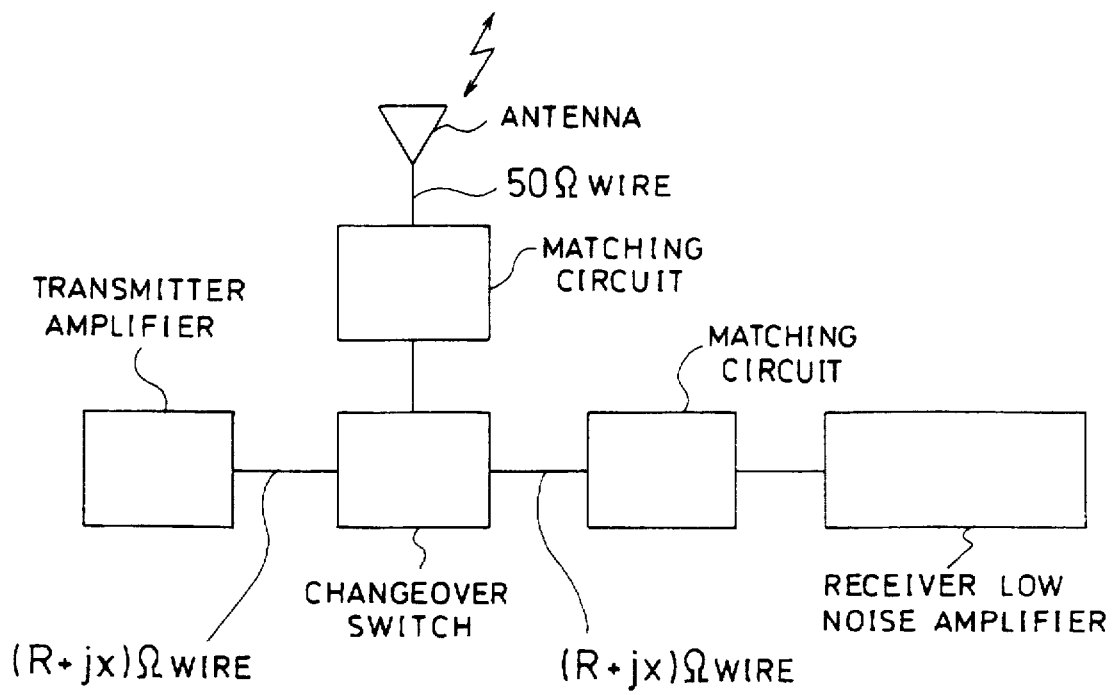

F I G. 5 (a)
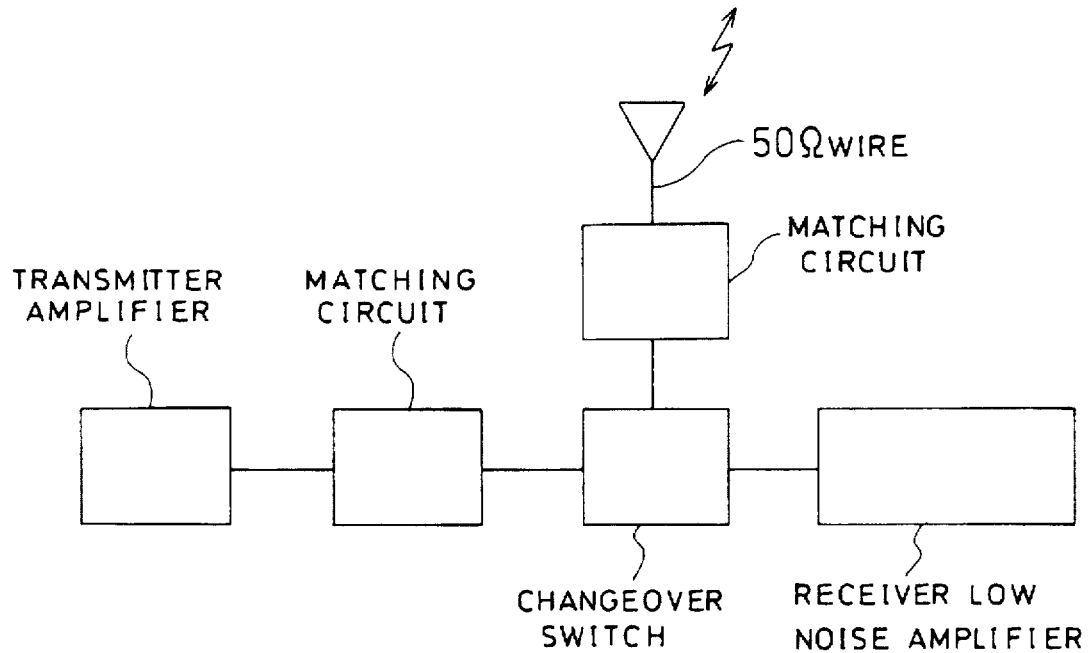
F I G. 5 (b)
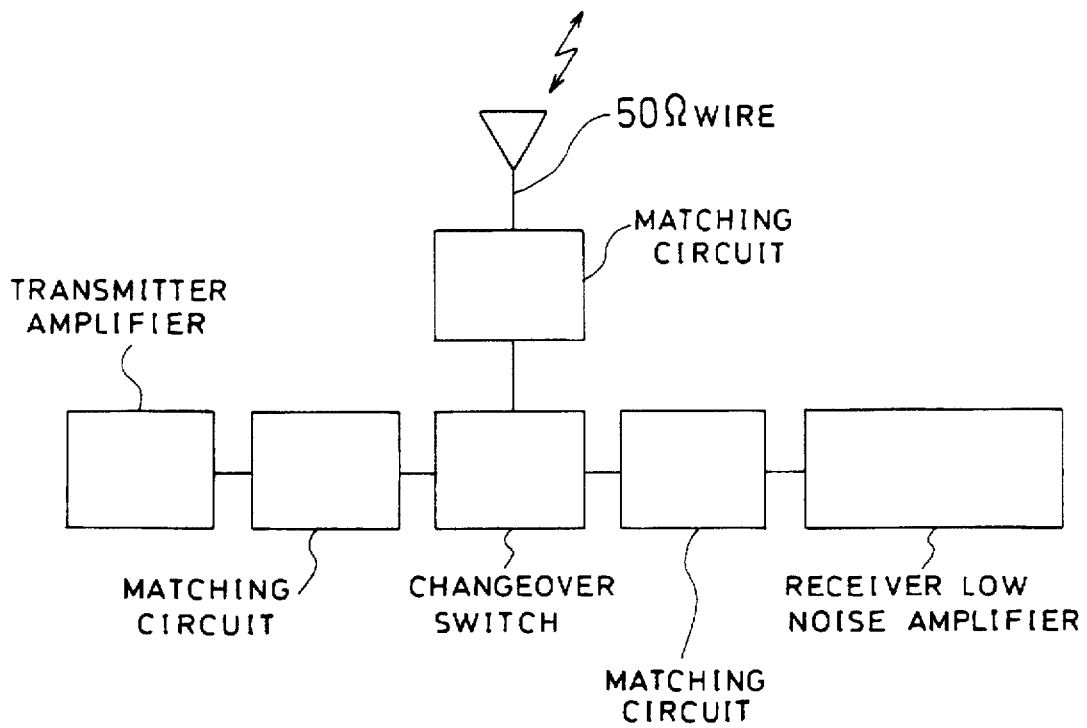

much larger number of users. In digital radiocommunication apparatuses, transmission and reception can be conducted at the same frequency by transmitting and receiving a signal in a time sharing manner, while two different frequencies are required for each line of the apparatuses of the conventional communication mode.

TRANSMITTING-RECEIVING CIRCUIT FOR RADIOCOMMUNICATION APPARATUS, SEMICONDUCTOR INTEGRATED CIRCUIT DEVICE INCLUDING THE CIRCUIT, AND RADIOCOMMUNICATION APPARATUS INCLUDING THE SAME

BACKGROUND OF THE INVENTION

The present invention relates to a transmitting/receiving circuit suitably used in a radiocommunication apparatus utilizing the same frequency for transmitting and receiving a signal, a semiconductor integrated circuit device including the transmitting/receiving circuit and a radiocommunication apparatus including the same.

Recently, radiocommunication apparatuses such as portable telephones have been developed to be compact, light and inexpensive, and the number of users of such equipment is rapidly increasing. In the conventional communication mode, the transmitting frequency is different from the receiving frequency. Furthermore, attempts have been made to digitalize such radiocommunication apparatuses in order to attain a much larger number of users. In digital radiocommunication apparatuses, transmission and reception can be conducted at the same frequency by transmitting and receiving a signal in a time sharing manner, while two different frequencies are required for each line of the apparatuses of the conventional communication mode.

A transmitter amplifier, a receiver low noise amplifier and a changeover switch for switching between transmission and reception of a transmitting/receiving circuit in a digital radiocommunication apparatus occasionally include gallium arsenide field effect transistors (hereinafter referred to as GaAs FETs) having various properties such as a low voltage operation, high efficiency, a low noise property and a high isolation property.

Furthermore, with the spread of portable wireless apparatuses, there is increasing demand for compact and light equipment. As a result, a large number of attempts have been made to produce a transmitting/receiving circuit including a transmitter power amplifier, a changeover switch, a receiver low noise amplifier, a matching circuit and the like as a semiconductor integrated circuit.

Now, an example of conventional transmitting/receiving circuits will be described referring to an accompanying drawing.

FIG. 8 is a diagram of the configuration of a transmitting/receiving circuit in a conventional digital radiocommunication apparatus using FETs. The transmitting/receiving circuit of FIG. 8 comprises a transmitter amplifier 10, a receiver low noise amplifier 20 and an antenna 30 for transmitting and receiving a signal. A changeover switch 40 switches the connection between the transmitter amplifier 10 and the antenna 30 and the connection between the receiver low noise amplifier 20 and the antenna 30, from one to the other. A first wire 51 having characteristic impedance of 50 Ω connects the antenna 30 to the changeover switch 40. A second wire 52 having characteristic impedance of 50 Ω connects the transmitter amplifier 10 to the changeover switch 40. A third wire 53 having characteristic impedance of 50 Ω connects the receiver low noise amplifier 20 to the changeover switch 40. A receiver matching circuit 60B matches inputs to the receiver low noise amplifier 20, and a transmitter matching circuit 70B matches outputs from the transmitter amplifier 10. A first coupling capacitance 81B couples an alternating current of the output from the transmitter amplifier 10 with an alternating current of the input to the transmitter matching circuit 70B, and a second coupling capacitance 82B couples an alternating current of the output from the receiver matching circuit 60B with an alternating current of the input to the receiver low noise amplifier 20.

The transmitter amplifier 10 of FIG. 8 comprises an FET 12 at the first stage, another FET 14 at the last stage, power supply terminals 15B, a matching circuit 13, which includes capacitances 16 and 18 and an inductor 17, for matching the front FET 12 with the rear FET 14. An inductor 19A is interposed between the gate terminal of the FET 14 and a bias voltage Vg1, and inductors 19B are interposed between the power supply terminals 15B of the FETs 12 and 14 and a supply voltage Vdd1. An inductor 24A is interposed between the gate terminal of a low noise FET 22 in the receiver low noise amplifier 20 and a bias voltage Vg2, and an inductor 24B is interposed between a reception wave output terminal 23B of the receiver low noise amplifier 20 and a supply voltage Vdd2. The receiver matching circuit 60B includes inductors 61 and 62, and the transmitter matching circuit 70B includes capacitances 71 and 73 and an inductor 72.

This transmitting/receiving circuit is operated as follows:

The receiving operation thereof will be first described.

At the time of receiving a signal, a bias voltage Vg2 is applied to the low noise FET 22 in the receiver low noise amplifier 20 and a supply voltage Vdd2 is applied to the reception wave output terminal 23B, thereby supplying the receiver low noise amplifier 20 with a necessary supply voltage. This amplifies a weak received signal input through the antenna 30. Since there is no need to operate the transmitter amplifier 10 in this case, no voltage is applied thereto for saving the power of a battery.

The received signal having been input through the antenna 30 is transferred through the first wire 51 having characteristic impedance of 50 Ω and supplied to an antenna side input/output terminal 41B of the changeover switch 40. At this point, in the changeover switch 40, a first FET 43 serving as a transmitter shunt FET and a third FET 45 serving as a receiver through FET are supplied with a voltage of, for example, 0 V so as to turn on the FETs 43 and 45, and a second FET 44 serving as a transmitter through FET and a fourth FET 46 serving as a receiver shunt FET are supplied with a voltage of, for example, −5 V so as to turn off the FETs 44 and 46 by a control voltage input through switch control signal input terminals 42B. Therefore, the received signal having been input through the antenna side input/output terminal 41B passes through the third FET 45 in an on state to be transferred to a receiver unit. A transmitter unit is electrically separated from the antenna because the second FET 44 is off, and is short-circuited by the first FET 43 in an on state.

The received signal having passed through the third FET 45 in an on state is transferred from a receiver side terminal 47 of the changeover switch 40 through the third wire 53 having characteristic impedance of 50 Ω and the second coupling capacitance 82B and is input to the receiver matching circuit 60B. The received signal having been input to the receiver matching circuit 60B is subjected to impedance matching by the two inductors 61 and 62 to be input to an input terminal 21 of the receiver low noise amplifier 20. The received signal having been input to the receiver low noise amplifier 20 is amplified by the low noise FET 22 and then output through the reception wave output terminal 23B.

Next, the transmitting operation of the transmitting/receiving circuit will be described.

At the time of transmitting a signal, a supply voltage Vdd1 is applied to the FET 12 at the first stage and the FET 14 at the last stage of the transmitter amplifier 10, and a bias voltage Vg1 is applied to the FET 14, thereby power amplifying a modulated signal input to the transmitter amplifier 10 up to a sufficiently high level to be supplied to the antenna 30. Since there is no need to operate the receiver low noise amplifier 20 in this case, no voltage is applied thereto for saving the power of the battery.

The modulated transmission signal is input through a transmission wave input terminal 11B, subjected to first power amplification by the front FET 12, input to the rear FET 14 via the matching circuit 13, and subjected to second power amplification by the FET 14 up to a desired power level. The amplified transmission signal is input to the transmitter matching circuit 70B via the first coupling capacitance 81B, converted to have impedance of 50 Ω by the transmitter matching circuit 70B and then input to a transmitter side terminal 48 of the changeover switch 40 via the second wire 52 having characteristic impedance of 50 Ω. At this point, in the changeover switch 40, the second FET 44 and the fourth FET 46 are supplied with a voltage of, for example, 0 V so as to be turned on and the first FET 43 and the third FET 45 are supplied with a voltage of, for example, −5 V so as to be turned off by a control voltage input through the switch control signal input terminals 42B. The transmission signal having been input through the transmitter side terminal 48 passes through the second FET 44 in an on state to be transferred toward the antenna 30. The transmission signal having been transferred toward the antenna 30 passes through the first wire 51 having characteristic impedance of 50 Ω, input to the antenna 30, and then output through the antenna 30 as an electric wave.

In the conventional transmitting/receiving circuit, the transmitter amplifier 10 and the receiver low noise amplifier 20 are connected to the changeover switch 40 via the second and third wires 52 and 53 each having characteristic impedance of 50 Ω, respectively. Therefore, a transmission signal output by the transmitter amplifier 10 and a received signal input to the receiver low noise amplifier 20 should be converted to have impedance of 50 Ω. Accordingly, when the transmitter amplifier 10, the receiver low noise amplifier 20 and the changeover switch 40 are desired to be integrated on one chip, the transmitter matching circuit 60B and the receiver matching circuit 70B are also required to be mounted on the same chip, resulting in largely increasing an area occupied by passive devices to be integrated such as inductors. As a result, the chip area is substantially increased, which disadvantageously makes it difficult to decrease the size and the cost of a radiocommunication apparatus. Thus, it is desired to provide a transmitting/ receiving circuit realizing a compact and inexpensive radiocommunication apparatus applicable to the new communication mode and a semiconductor integrated circuit device mounting the transmitting/receiving circuit.

In addition, when a signal is switched by the changeover switch 40 at low impedance, the voltage can be decreased and isolation between the transmitter unit and the receiver unit can be improved. However, in the conventional circuit, a signal is switched at impedance of 50 Ω as described above, and hence, the isolation characteristic is poor. This causes another problem that an FET with a satisfactory isolation characteristic is required to be used. The isolation herein indicates a ratio between signals correctly transferred from the transmitter amplifier 10 to the antenna 30 and signals incorrectly transferred from the transmitter amplifier 10 to the receiver low noise amplifier 20 when the changeover switch 40 is in a state for outputting a transmission signal from the transmitter amplifier 10 to the antenna 30. Having a satisfactory isolation characteristic means few signals are transferred from the transmitter amplifier 10 to the receiver low noise amplifier 20. Actually, there always exist some signals leaked from the transmitter amplifier 10 to the receiver low noise amplifier 20.

SUMMARY OF THE INVENTION

The present invention was devised to solve the aforementioned problems at a stroke so as to make compact a radiocommunication apparatus and improve the isolation characteristic between a transmitter unit and a receiver unit.

A first transmitting/receiving circuit for a radiocommunication apparatus of the invention comprises a transmitter amplifier for amplifying an input transmission signal and outputting the amplified transmission signal; a receiver amplifier for amplifying an input received signal and outputting the amplified received signal; a changeover switch having an antenna side input/output terminal through which the transmission signal is output to an antenna via a wire having prescribed characteristic impedance and the received signal is input from the antenna via the wire, for switching a first connection state for outputting the transmission signal received from the transmitter amplifier via no matching circuit to the antenna side input/output terminal and a second connection state for outputting the received signal received through the antenna side input/output terminal to the receiver amplifier; a receiver matching circuit interposed between the changeover switch and the receiver amplifier for matching the input impedance of the receiver amplifier with the output impedance of the transmitter amplifier; and an antenna side matching circuit interposed between the wire and the changeover switch for matching the characteristic impedance of the wire with the output impedance of the transmitter amplifier.

In the first transmitting/receiving circuit, the transmission signal output from the transmitter amplifier is input to the changeover switch via no matching circuit, while the received signal output from the changeover switch is input to the receiver amplifier via the receiver matching circuit. Therefore, within the changeover switch, the output impedance of the transmitter amplifier is matched with the input impedance of the receiver amplifier, and both the output impedance and the input impedance are small in the changeover switch. As a result, the isolation characteristic of the changeover switch can be improved and the area occupied by the changeover switch can be minimized.

Furthermore, since the characteristic impedance of the wire is matched with the output impedance of the transmitter amplifier by the antenna side matching circuit, the receiver matching circuit has a function to merely match the input impedance of the receiver amplifier with the output impedance of the transmitter amplifier. This results in minimizing the area occupied by the receiver matching circuit. Thus, the size of a chip including the transmitter amplifier, the receiver amplifier and the changeover switch, and in its turn, the size of the radiocommunication apparatus including the chip can be minimized, and the production cost can be decreased.

Since the antenna side matching circuit is interposed between the wire and the changeover switch, when the transmitter amplifier, the receiver amplifier and the changeover switch are integrated on one chip, the antenna side matching circuit can be disposed outside of the chip. This results in a further more compact chip, a further more compact radiocommunication apparatus, and a further lower production cost.

It is preferable that the first transmitting/receiving circuit further comprises a first coupling capacitance interposed between the transmitter amplifier and the changeover switch and a second coupling capacitance interposed between the changeover switch and the receiver matching circuit.

By adopting this configuration, the coupling state between the transmitter amplifier and the changeover switch can be stabilized, and the coupling state between the changeover switch and the receiver matching circuit can be also stabilized.

In the first transmitting/receiving circuit, the antenna side matching circuit can be directly connected to the antenna side input/output terminal. In this case, the antenna side matching circuit can be formed on the same chip mounting the transmitter amplifier, the receiver amplifier and the changeover switch. Therefore, a still more compact radiocommunication apparatus can be realized.

In the first transmitting/receiving circuit, the changeover switch preferably has a transmitter through FET and a transmitter shunt FET connected in series to each other and a receiver through FET and a receiver shunt FET connected in series to each other, the transmitter amplifier preferably has at least one amplifier FET for amplifying the input transmission signal, and the amplifier FET at the last stage of the transmitter amplifier preferably works also as the transmitter shunt FET of the changeover switch.

By adopting this configuration, there is no need to provide a separate transmitter shut FET in the changeover switch, thereby simplifying the configuration of the transmitting/receiving circuit for a radiocommunication apparatus. Therefore, since the number of required elements can be reduced, the radiocommunication apparatus can be made more compact and can attain higher reliability.

A second transmitting/receiving circuit for a radiocommunication apparatus of the invention comprises a transmitter amplifier for amplifying an input transmission signal and outputting the amplified transmission signal; a receiver amplifier for amplifying an input received signal and outputting the amplified received signal; a changeover switch having an antenna side input/output terminal through which the transmission signal is output to an antenna via a wire having prescribed characteristic impedance and the received signal is input from the antenna via the wire, for switching a first connection state for outputting the transmission signal received from the transmitter amplifier to the antenna side input/output terminal and a second connection state for outputting the received signal received through the antenna side input/output terminal to the receiver amplifier via no matching circuit, from one to the other; a transmitter matching circuit interposed between the transmitter amplifier and the changeover switch for matching the output impedance of the transmitter amplifier with the input impedance of the receiver amplifier; and an antenna side matching circuit interposed between the wire and the changeover switch for matching the characteristic impedance of the wire with the input impedance of the receiver amplifier.

In the second transmitting/receiving circuit, the transmission signal output from the transmitter amplifier is input to the changeover switch via the transmitter matching circuit, while the received signal output by the changeover switch is input to the receiver amplifier via no matching circuit. Therefore, within the changeover switch, the output impedance of the transmitter amplifier is matched with the input impedance of the receiver amplifier, and both the output impedance and the input impedance are small in the changeover switch. As a result, the isolation characteristic of the changeover switch can be improved and the area occupied by the changeover switch can be minimized.

Furthermore, since the characteristic impedance of the wire is matched with the input impedance of the receiver amplifier by the antenna side matching circuit, the transmitter matching circuit has a function merely to match the output impedance of the transmitter amplifier with the input impedance of the receiver amplifier. Therefore, the area occupied by the transmitter matching circuit can be minimized. Thus, a chip including the transmitter amplifier, the receiver amplifier and the changeover switch, and in its turn, the radiocommunication apparatus including the chip can be made compact and the production cost can be reduced.

Since the antenna side matching circuit is interposed between the wire and the changeover switch, when the transmitter amplifier, the receiver amplifier and the changeover switch are integrated on one chip, the antenna side matching circuit can be formed outside of the chip. This results in a further more compact chip, a further more compact radiocommunication apparatus, and a further lower production cost.

A third transmitting/receiving circuit for a radiocommunication apparatus of the invention comprises a transmitter amplifier for amplifying an input transmission signal and outputting the amplified transmission signal; a receiver amplifier for amplifying an input received signal and outputting the amplified received signal; a changeover switch having an antenna side input/output terminal through which the transmission signal is output to an antenna via a wire having prescribed characteristic impedance and the received signal is input from the antenna via the wire, for switching a first connection state for outputting the transmission signal received from the transmitter amplifier to the antenna side input/output terminal and a second connection state for outputting the received signal received through the antenna side input/output terminal to the receiver amplifier, from one to the other; a transmitter matching circuit interposed between the transmitter amplifier and the changeover switch for matching the output impedance of the transmitter amplifier with optimal characteristic impedance of the changeover switch; a receiver matching circuit interposed between the changeover switch and the receiver amplifier for matching the input impedance of the receiver amplifier with the optimal characteristic impedance of the changeover switch; and an antenna side matching circuit interposed between the wire and the changeover switch for matching the characteristic impedance of the wire with the optimal characteristic impedance of the changeover switch.

In the third transmitting/receiving circuit, the transmission signal output from the transmitter amplifier is input to the changeover switch via the transmitter matching circuit, while the received signal output from the changeover switch is input to the receiver amplifier via the receiver matching circuit. Therefore, within the changeover switch, the output impedance of the transmitter amplifier is matched with the input impedance of the receiver amplifier, and both the output impedance and the input impedance are small in the changeover switch. This results in improving the isolation characteristic of the changeover switch.

Since the characteristic impedance of the changeover switch can be optimized, the area occupied by the changeover switch and the insertion loss of a through FET therein can be minimized.

The transmitter matching circuit has a function to merely match the output impedance of the transmitter amplifier with the optimal characteristic impedance of the changeover switch, and the receiver matching circuit has a function merely to match the input impedance of the receiver amplifier with the optimal characteristic impedance of the changeover switch. Accordingly, the areas occupied by the transmitter matching circuit and the receiver matching circuit can be both minimized. Thus, a chip including the transmitter amplifier, the receiver amplifier and the changeover switch, and in its turn, the radiocommunication apparatus including the chip can be made compact and the production cost can be reduced.

Since the antenna side matching circuit is interposed between the wire and the changeover switch, when the transmitter amplifier, the receiver amplifier and the changeover switch are integrated on one chip, the antenna side matching circuit can be formed outside of the chip. This results in a further more compact chip, a further more compact radiocommunication apparatus, and a further lower production cost.

A fourth transmitting/receiving circuit for a radiocommunication apparatus of the invention comprises a transmitter amplifier having at least one amplifier FET for amplifying an input transmission signal; a receiver amplifier for amplifying an input received signal and outputting the amplified received signal; a changeover switch including an antenna side input/output terminal through which the transmission signal is output to an antenna and the received signal is input from the antenna, a transmitter through FET and a transmitter shunt FET connected in series to each other, and a receiver through FET and a receiver shunt FET connected in series to each other, for switching a first connection state for outputting the transmission signal received from the transmitter amplifier to the antenna side input/output terminal and a second connection state for outputting the received signal received through the antenna side input/output terminal to the receiver amplifier, from one to the other. The amplifier FET at the last stage of the transmitter amplifier also works as the transmitter shunt FET of the changeover switch.

In the fourth transmitting/receiving circuit, since the amplifier FET at the last stage of the transmitter amplifier also works as the transmitter shunt FET of the changeover switch, there is no need to separately provide a transmitter shunt FET of the changeover switch. Therefore, the configuration of the transmitting/receiving circuit for a radiocommunication apparatus can be simplified and the number of required elements can be reduced, and hence, the radiocommunication apparatus can become more compact and more reliable.

A first semiconductor integrated circuit device of the invention comprises a semiconductor substrate; a transmitter amplifier formed on the semiconductor substrate for amplifying an input transmission signal and outputting the amplified transmission signal; a receiver amplifier formed on the semiconductor substrate for amplifying an input received signal and outputting the amplified received signal; a changeover switch formed on the semiconductor substrate and having an antenna side input/output terminal through which the transmission signal is output to an antenna via a wire having prescribed characteristic impedance and an antenna side matching circuit for matching the characteristic impedance of the wire with the output impedance of the transmitter amplifier and the received signal is input from the antenna via the wire and the antenna side matching circuit, for switching a first connection state for outputting the transmission signal received from the transmitter amplifier via no matching circuit to the antenna side input/output terminal and a second connection state for outputting the received signal received through the antenna side input/output terminal to the receiver amplifier, from one to the other; and a receiver matching circuit formed on the semiconductor substrate and interposed between the receiver amplifier and the changeover switch for matching the input impedance of the receiver amplifier with the output impedance of the transmitter amplifier.

In the first semiconductor integrated circuit device, the transmitter amplifier, the receiver amplifier, the changeover switch and the receiver matching circuit of the first transmitting/receiving circuit are formed on one semiconductor substrate. Accordingly, the transmitter amplifier, the receiver amplifier, the changeover switch and the receiver matching circuit of the transmitting/receiving circuit can be definitely integrated on one chip.

In the first semiconductor integrated circuit device, the antenna side matching circuit can be formed on the semiconductor substrate. In this case, the transmitter amplifier, the receiver amplifier, the changeover switch, the receiver matching circuit and the antenna side matching circuit can be integrated on one chip.

In the first semiconductor integrated circuit device, the changeover switch preferably has a transmitter through FET and a transmitter shunt FET connected in series to each other and a receiver through FET and a receiver shunt FET connected in series to each other, the transmitter amplifier preferably has at least one amplifier FET for amplifying the input transmission signal, and the amplifier FET at the last stage of the transmitter amplifier preferably works also as the transmitter shunt FET of the changeover switch. When this configuration is adopted, there is no need to separately provide a transmitter shunt FET of the changeover switch.

A second semiconductor integrated circuit device of the invention comprises a semiconductor substrate; a transmitter amplifier formed on the semiconductor substrate and having at least one amplifier FET for amplifying an input transmission signal; a changeover switch formed on the semiconductor substrate and having an antenna side input/output terminal through which the transmission signal is output to an antenna and a received signal is input from the antenna, a transmitter through FET and a transmitter shunt FET connected in series to each other, and a receiver through FET and a receiver shunt FET connected in series to each other, for switching a first connection state for outputting the transmission signal received from the transmitter amplifier to the antenna side input/output terminal and a second connection state for outputting the received signal received through the antenna side input/output terminal to a receiver amplifier, from one to the other. The amplifier FET at the last stage of the transmitter amplifier also works as the transmitter shunt FET of the changeover switch.

In the second semiconductor integrated circuit device, there is no need to separately provide a transmitter shunt FET of the changeover switch, and hence, the configuration of the transmitting/receiving circuit for a radiocommunication apparatus can be simplified. Therefore, the number of required elements can be reduced, and in addition, there is no need to adjust the transmitting/receiving circuit, which otherwise conventionally requires great efforts. As a result, not only the radiocommunication apparatus can become more compact and more reliable, but also the transmitter amplifier, the receiver amplifier, the changeover switch and the receiver matching circuit can be definitely integrated on one chip with ease.

A first radiocommunication apparatus of the invention comprises an antenna; a wire connected to the antenna and having prescribed characteristic impedance; a transmitter amplifier for amplifying an input transmission signal and outputting the amplified transmission signal; a receiver amplifier for amplifying an input received signal and outputting the amplified received signal; a changeover switch having an antenna side input/output terminal through which the transmission signal is output to the antenna via the wire and the received signal is input from the antenna via the wire, for switching a first connection state for outputting the transmission signal received from the transmitter amplifier via no matching circuit to the antenna side input/output terminal and a second connection state for outputting the received signal received through the antenna side input/output terminal to the receiver amplifier, from one to the other; a receiver matching circuit interposed between the receiver amplifier and the changeover switch for matching the input impedance of the receiver amplifier with the output impedance of the transmitter amplifier; and an antenna side matching circuit interposed between the wire and the changeover switch for matching the characteristic impedance of the wire with the input impedance of the transmitter amplifier.

A second radiocommunication apparatus of the invention comprises an antenna; a wire connected to the antenna and having prescribed characteristic impedance, a transmitter amplifier for amplifying an input transmission signal and outputting the amplified transmission signal; a receiver amplifier for amplifying an input received signal and outputting the amplified received signal; a changeover switch having an antenna side input/output terminal through which the transmission signal is output to the antenna via the wire and the received signal is input from the antenna via the wire, for switching a first connection state for outputting the transmission signal received from the transmitter amplifier to the antenna side input/output terminal and a second connection state for outputting the received signal received through the antenna side input/output terminal to the receiver amplifier via no matching circuit, from one to the other; a transmitter matching circuit interposed between the transmitter amplifier and the changeover switch for matching the output impedance of the transmitter amplifier with the input impedance of the receiver amplifier; and an antenna side matching circuit interposed between the wire and the changeover switch for matching the characteristic impedance of the wire with the input impedance of the receiver amplifier.

A third radiocommunication apparatus of the invention comprises an antenna; a wire connected to the antenna and having prescribed characteristic impedance; a transmitter amplifier for amplifying an input transmission signal and outputting the amplified transmission signal; a receiver amplifier for amplifying an input received signal and outputting the amplified received signal; a changeover switch having an antenna side input/output terminal through which the transmission signal is output to the antenna via the wire and the received signal is input from the antenna via the wire, for switching a first connection state for outputting the transmission signal received from the transmitter amplifier to the antenna side input/output terminal and a second connection state for outputting the received signal received through the antenna side input/output terminal to the receiver amplifier; a transmitter matching circuit interposed between the transmitter amplifier and the changeover switch for matching the output impedance of the transmitter amplifier with optimal characteristic impedance of the changeover switch; a receiver matching circuit interposed between the changeover switch and the receiver amplifier for matching the input impedance of the receiver amplifier with the optimal characteristic impedance of the changeover switch; and an antenna side matching circuit interposed between the wire and the changeover switch for matching the characteristic impedance of the wire with the optimal characteristic impedance of the changeover switch.

Any of the first through third radiocommunication apparatuses can attain a reduced size and a lower production cost, and the isolation characteristic of the changeover switch can also be improved.

BRIEF DESCRIPTION OF THE DRAWINGS

FIG. 5a and 5b are schematic diagrams of the rough configurations of transmitting/receiving circuits for a radiocommunication apparatus according to third and fourth embodiments of the invention, respectively;

DETAILED DESCRIPTION OF THE INVENTION

The present invention will now be described by way of example referring to the accompanying drawings.

(Embodiment 1)

Figure 1:
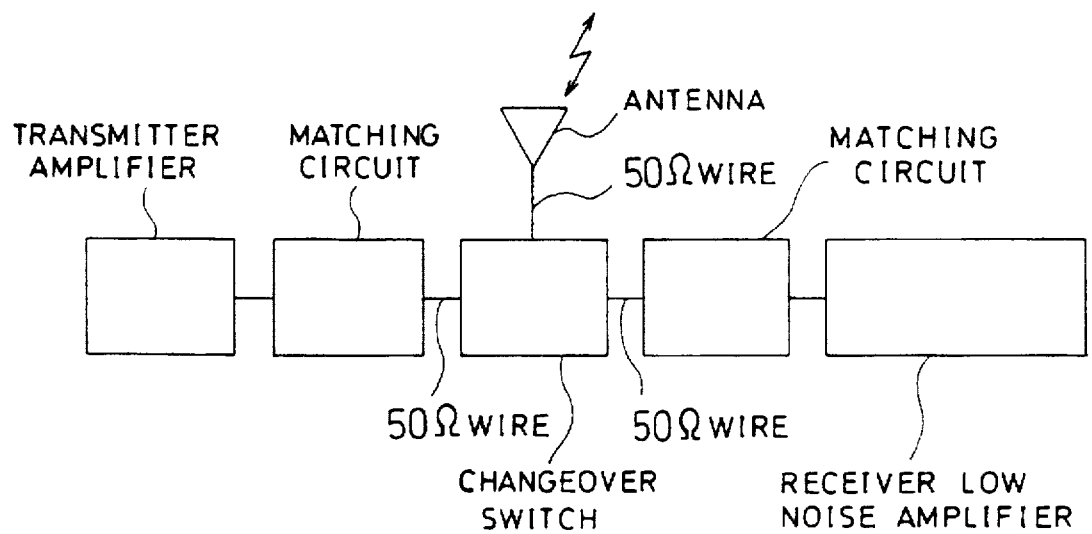
FIG. 1a is a schematic diagram of the rough configuration of a conventional transmitting/receiving circuit for a radiocommunication apparatus.
FIG. 1b is a schematic diagram of the rough configuration of a transmitting/receiving circuit for a radiocommunication apparatus according to a first embodiment of the invention.

FIG. 1a is a schematic diagram of the rough configuration of a conventional transmitting/receiving circuit for a radiocommunication apparatus and FIG. 1b is a schematic diagram of the rough configuration of a transmitting/receiving circuit for a radiocommunication apparatus of this embodiment.

In the transmitting/receiving circuit of FIG. 1a, as is described above regarding the background art, wires each having characteristic impedance of 50 $\Omega$ are respectively provided between an antenna and a changeover switch, between a transmitter amplifier and the changeover switch, and between a receiver low noise amplifier and the changeover switch. Therefore, matching circuits are interposed between the transmitter amplifier and the wire with characteristic impedance of 50 $\Omega$ and between the receiver low noise amplifier and the wire with characteristic impedance of 50 $\Omega$.

In contrast, in the transmitting/receiving circuit of FIG. 1b, although an antenna and a changeover switch are connected to each other via a wire having characteristic impedance of 50 Ω, a wire with characteristic impedance of 50 Ω is interposed neither between a transmitter amplifier and the changeover switch nor between a receiver low noise amplifier and the changeover switch. Furthermore, although a receiver matching circuit is interposed between the receiver low noise amplifier and the changeover switch, there provided no matching circuit between the transmitter amplifier and the changeover switch. In the circuit of FIG. 1b, the impedance is matched between the transmitter amplifier and the wire with characteristic impedance of 50 Ω by an antenna side matching circuit disposed between the wire with characteristic impedance of 50 Ω and the changeover switch, and the receiver matching circuit matches the impedance of the transmitter amplifier with that of the receiver low noise amplifier.

Now, a specific configuration of the transmitting/ receiving circuit for a radiocommunication apparatus of this embodiment will be described referring to FIG. 2.

Figure 2:
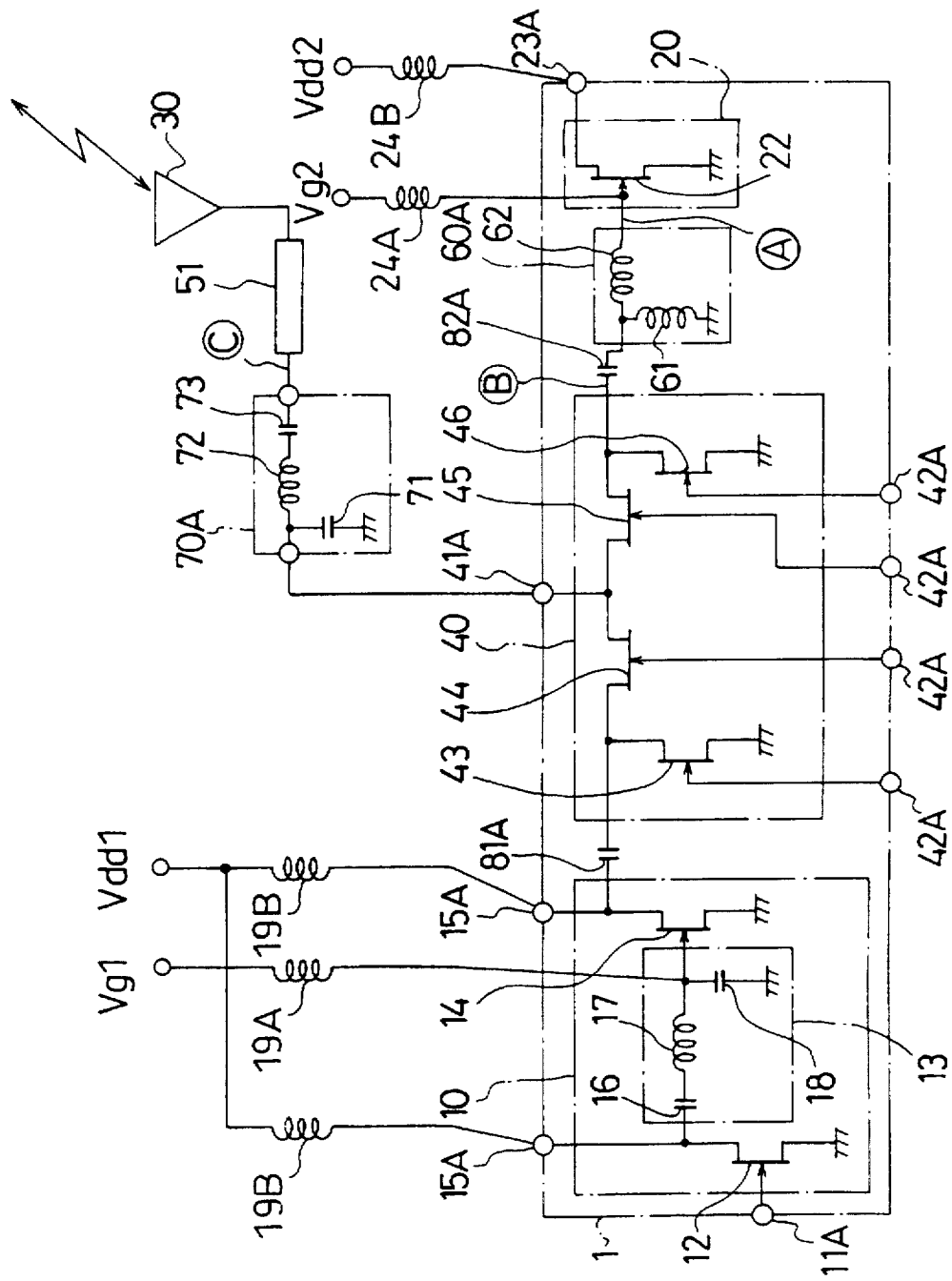
FIG. 2 is a diagram showing a specific configuration of the transmitting/receiving circuit for a radiocommunication apparatus according to the first embodiment.

The transmitting/receiving circuit of FIG. 2 comprises a transmitter amplifier 10, a receiver low noise amplifier 20, an antenna 30 for transmitting and receiving a signal, and a changeover switch 40 for switching the connection between the transmitter amplifier 10 and the antenna 30 and the connection between the receiver low noise amplifier 20 and the antenna 30, from one to the other. A first wire 51 having characteristic impedance of 50 Ω is interposed between the antenna 30 and the changeover switch 40. A receiver matching circuit 60A matches the input impedance of the receiver low noise amplifier 20 with the output impedance of the transmitter amplifier 10. An antenna side matching circuit 70A matches the input impedance of the receiver low noise amplifier 20, which is matched with the output impedance of the transmitter amplifier 10 by the receiver matching circuit 60A, with the characteristic impedance 50 Ω of the first wire 51. A first coupling capacitance 81A directly couples the output of the transmitter amplifier 10 and the input of the changeover switch 40. A second coupling capacitance 82A directly couples the receiver matching circuit BOA and the changeover switch 40. In the circuit of FIG. 2, a matching circuit 13 matches an FET 12 at the first stage with an FET 14 at the last stage, which is not related to the spirit of the invention.

The transmitter amplifier 10, the receiver low noise amplifier 20, the changeover switch 40 and the receiver matching circuit 60A are formed on one semiconductor substrate as an integrated circuit 1.

The transmitter amplifier 10 of FIG. 2 has the FET 12 at the first stage, the FET 14 at the last stage, and the matching circuit 13 including capacitances 16 and 18 and an inductor 17 for matching the FET 12 with the FET 14. The transmitting/receiving integrated circuit 1 is provided with supply terminals 15A. An inductor 19A is interposed between the gate terminal of the rear FET 14 and a bias voltage Vg1, and inductors 19B are interposed between the supply terminals 15A and a supply voltage Vdd1. The transmitting/receiving integrated circuit 1 is further provided with a reception wave output terminal 23A. An inductor 24A is interposed between the gate terminal of a low noise FET 22 in the receiver low noise amplifier 20 and a bias voltage Vg2, and an inductor 24B is interposed between the reception wave output terminal 23A and a supply voltage Vdd2. The antenna side matching circuit 70A has capacitances 71 and 73 and an inductor 72.

The operation of this transmitting/receiving circuit for a radiocommunication apparatus will be described referring to FIGS. 2 and 3.

Figure 3:
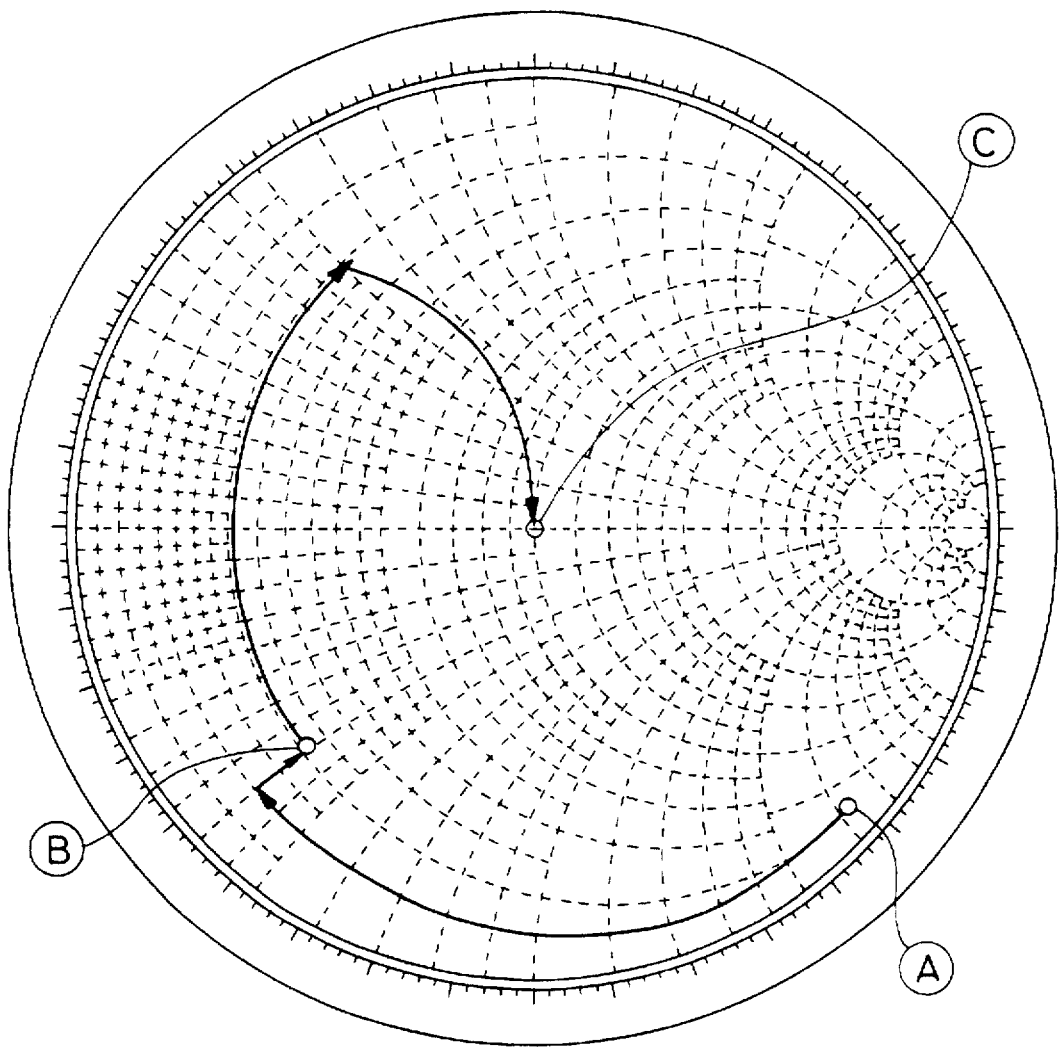
FIG. 3 is a Smith chart of an impedance matching state used for describing the operation of the transmitting/receiving circuit for a radiocommunication apparatus of the first embodiment.
Figure 4:
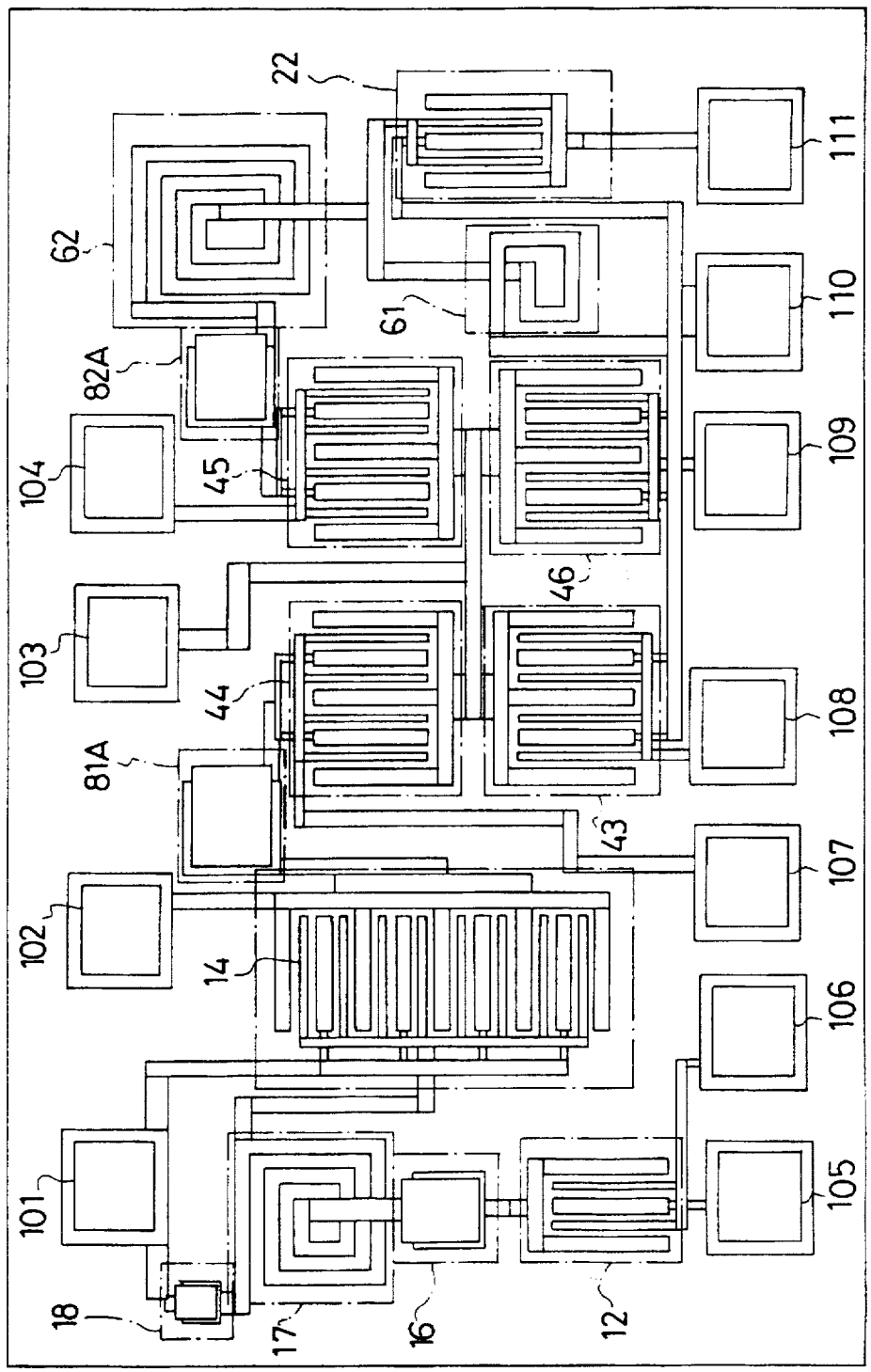
FIG. 4 is a schematic diagram of the rough configuration of a transmitting/receiving circuit for a radiocommunication apparatus according to a second embodiment of the invention.

FIG. 3 is a Smith chart showing the output matching state of the transmitter amplifier 10 and the input matching state of the receiver low noise amplifier 20. The input impedance of the receiver low noise amplifier 20 using a GaAs FET is generally positioned around a point A in FIG. 3, and the output impedance of the transmitter amplifier 10 is generally positioned around a point B, (17−j 8.8) Ω.

Figure 8:
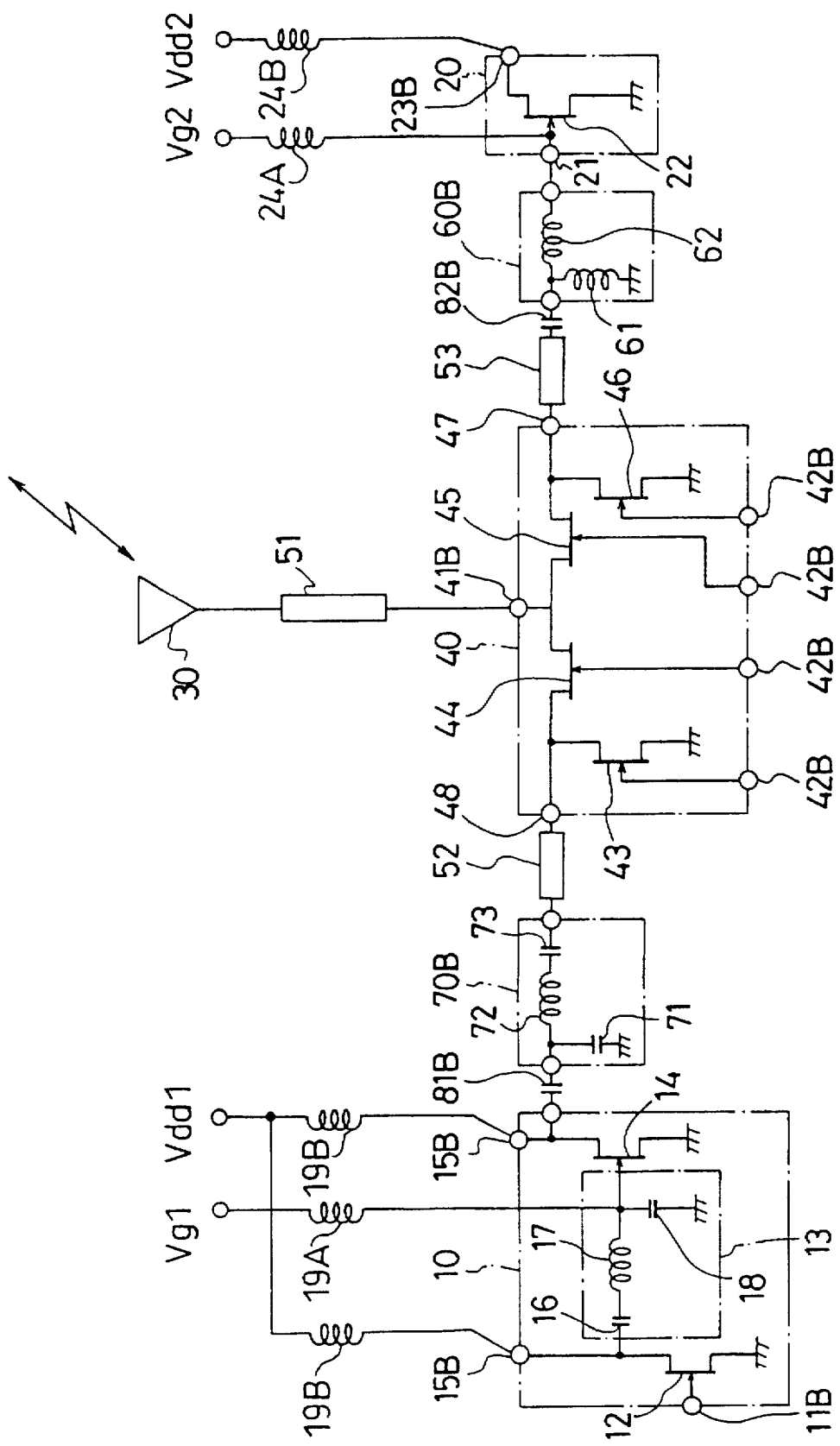
FIG. 8 is a diagram showing a specific configuration of a conventional transmitting/receiving circuit for a radiocommunication apparatus.

In the conventional transmitting/receiving circuit, the input impedance to the receiver low noise amplifier 20 is matched with the impedance of 50 Ω by the receiver matching circuit 60B and the output impedance of the transmitter amplifier 10 is matched with the impedance of 50 Ω by the transmitter matching circuit 70B, as described referring to FIG. 8. Specifically, the input impedance of the receiver low noise amplifier 20 at the point A is matched to be positioned at a point C by the receiver matching circuit 60B, and the output impedance of the transmitter amplifier 10 at the point B is matched to be positioned at the point C by the transmitter matching circuit 70B. This is because the input impedance of the receiver low noise amplifier 20 and the output impedance of the transmitter amplifier 10 should be matched with the impedance of the wires having characteristic impedance of 50 Ω.

In this embodiment, in contrast, the input impedance of the receiver low noise amplifier 20 is matched with the output impedance (at the point B) of the transmitter amplifier 10 by the receiver matching circuit 60A. The resistance at the point B is (17−j 8.8) Ω, which is significantly smaller than the characteristic impedance 50 Ω of the first wire 51.

The output impedance of the transmitter amplifier 10 and the input impedance of the receiver low noise amplifier 20 both at the point B are matched with the characteristic impedance (50 Ω) of the first wire 51 by the antenna side matching circuit 70A. In other words, an arrow from the point A to the point B indicates the matching by the receiver matching circuit 60A, and an arrow from the point B to the point C (50 Ω) indicates the matching by the antenna side matching circuit 70A. The spirit of Embodiment 1 is in that both the input impedance of the receiver low noise amplifier 20 matched to be positioned at the point B and the output impedance of the transmitter amplifier 10 at the point B are matched to be positioned at the point C by the antenna side matching circuit 70A.

Now, the receiving operation of the transmitting/receiving circuit will be described.

A received signal input through the antenna 30 passes through the first wire 51 having characteristic impedance of 50 Ω, subjected to impedance conversion by the antenna side matching circuit 70A, and input to an antenna side input/output terminal 41A. At this point, in the changeover switch 40, a first FET 43 serving as a transmitter shunt FET and a third FET 45 serving as a receiver through FET are on and a second FET 44 serving as a transmitter through FET and a fourth FET 46 serving as a receiver shunt FET are turned off by control signals input through switch control signal input terminals 42A, as is described referring to the conventional circuit. Therefore, the received signal input through the antenna side input/output terminal 41A passes through the third FET 45 in an on state to be transferred to the receiver unit. Further, the transmitter unit is electrically separated from the antenna because the second FET 44 is off, and is short-circuited by the first FET 43 in an on state.

The received signal having passed through the third FET 45 in an on state is input to the receiver matching circuit 60A through the second coupling capacitance 82A. The received signal having been input to the receiver matching circuit 60A is subjected to the impedance matching by two inductors 61 and 62, amplified by the low noise FET 22 in the receiver low noise amplifier 20, and then output through the reception wave output terminal 23A.

The transmitting operation of this circuit will now be described.

A modulated transmission wave is input to a transmission wave input terminal 11A. The input transmission wave is subjected to first power amplification by the FET 12 at the first stage, input through the matching circuit 13 to the FET 14 at the last stage, and subjected to second power amplification by the FET 14 up to a desired power level. The amplified transmission signal is directly input to the second FET 44 of the changeover switch 40 through the first coupling capacitance 81A. At this point, the changeover switch 40 performs a reverse operation to that in receiving a signal. Specifically, by control signals input through the switch control signal input terminals 42A, the second FET 44 and the fourth FET 46 are turned on and the first FET 43 and the third FET 45 are turned off. Therefore, the transmission signal having been input through the first coupling capacitance 81A passes through the second FET 44 in an on state to be transferred toward the antenna 30. At this point, the receiver unit is electrically separated from the transmitter unit because the third FET 45 is off, and is short-circuited by the fourth FET 46 in an on state. The transmission signal transferred toward the antenna 30 is input to the antenna side matching circuit 70A, subjected to impedance conversion to have characteristic impedance of 50 Ω by the antenna side matching circuit 70A, and input to the antenna 30 through the first wire 51. Then, the transmission signal is output through the antenna 30 as an electric wave.

In Embodiment 1, the input impedance of the receiver low noise amplifier 20 is matched with the output impedance of the transmitter amplifier 10 by the receiver matching circuit 60A in this manner. As a result, there is no need to provide a matching circuit between the transmitter amplifier 10 and the changeover switch 40, and the transmitter amplifier 10 can be directly connected to the changeover switch 40. Thus, it is possible to decrease the characteristic impedance of the changeover switch 40 to be lower than 50 Ω. This results in lowering the characteristic impedance of a portion between the changeover switch 40 and the antenna side matching circuit 70A to be smaller than 50 Ω. Therefore, fewer signals leak from the transmitter amplifier 10 to the receiver low noise amplifier 20 when the changeover switch 40 switches on the connection between the transmitter amplifier 10 and the antenna 30, thereby improving the isolation characteristic. Also, when the changeover switch 40 switches on the connection between the receiver low noise amplifier 20 and the antenna 30, fewer signals leak from the receiver low noise amplifier 20 to the transmitter amplifier 10.

In addition, since the antenna side matching circuit 70A can be disposed between the antenna 30 and the antenna side input/output terminal 41A, the antenna side matching circuit 70A can be taken out of the transmitting/receiving integrated circuit 1. Accordingly, the area of the integrated chip can be decreased, resulting in reducing the size and the cost of the transmitting/receiving circuit.

Furthermore, since the antenna side matching circuit 70A is commonly used in receiving and transmitting a signal, the size of the receiver matching circuit 60A can be decreased, resulting in further reducing the size and the production cost of the entire chip.

In the transmitting/receiving circuit of Embodiment 1, it is possible to integrate the antenna side matching circuit 70A with the transmitting/receiving integrated circuit 1.

(Embodiment 2)

A semiconductor integrated circuit device of Embodiment 2 of the invention will now be described referring to the accompanying drawing. The semiconductor integrated circuit device of this embodiment realizes the transmitting/receiving circuit for a radiocommunication apparatus of Embodiment 1, and is operated in the same manner as described in Embodiment 1.

FIG. 3 is a diagram showing the layout of the semiconductor integrated circuit device of Embodiment 2, wherein like reference numerals are used to refer to like elements used in Embodiment 1 shown in FIG. 2 and the description thereof is omitted. The FET 12 at the first stage of the transmitter amplifier 10 is constructed with a drain, a gate, a source, a gate and a drain successively illustrated in this order from the left side of the drawing.

The semiconductor integrated circuit device of FIG. 3 comprises a pad 101 for a ground terminal, a pad 102 for the supply terminal 15A, a pad 103 for the antenna side input/output terminal 41A, a pad 104 for the switch control signal input terminal 42A connected to the third FET 45 of the changeover switch 40, a pad 105 for the ground terminal and the source terminal of the FET 12 at the first stage of the transmitter amplifier 10, a pad 106 for the transmission wave input terminal 11A and the gate terminal of the FET 12 at the first stage of the transmitter amplifier 10, a pad 107 for the gate terminal of the second FET 44 of the changeover switch 40, a pad 108 for the switch control signal input terminal 42A connected to the first FET 43 of the changeover switch 40, a pad 109 for the switch control signal input terminal 42A connected to the fourth FET 46 of the changeover switch 40, a pad 110 for the ground terminal, and a pad 111 for the reception wave output terminal 23A.

In this manner, when the entire elements constructing the transmitting/receiving circuit are integrated on one chip, the circuit configuration of Embodiment 1 enables the antenna side matching circuit 70A, which is conventionally required to be integrated in the chip, to be disposed outside of the chip.

In addition, since the antenna side matching circuit 70A is commonly used in transmitting and receiving a signal, the sizes of the inductors 61 and 62 included in the receiver matching circuit 60B can be decreased, resulting in realizing a compact and inexpensive semiconductor integrated circuit device.

The transmitter amplifier 10, the receiver low noise amplifier 20 and the changeover switch 40 of Embodiment 1 use GaAs FETs, which can be replaced with silicon MOSFETs.

(Embodiment 3)

A transmitting/receiving circuit for a radiocommunication apparatus of Embodiment 3 of the invention will now be described referring to the accompanying drawing.

FIG. 5a shows the rough configuration of the transmitting/receiving circuit for a radiocommunication apparatus of this embodiment, which is different from that of Embodiment 1 in the following points: A transmitter matching circuit is provided between a transmitter amplifier and a changeover switch, while no matching circuit is disposed between a receiver low noise amplifier and the changeover switch in this embodiment.

In order to adopt this configuration, a silicon bipolar transistor and a GaAs FET are required to be used in the receiver low noise amplifier and the transmitter amplifier, respectively. In addition, the input impedance of the silicon bipolar transistor is required to be lower than that of the GaAs FET. In this case, the input impedance of the transmitter amplifier should be lowered by the transmitter matching circuit to be matched with the output impedance of the receiver low noise amplifier.

(Embodiment 4)

A transmitting/receiving circuit for a radiocommunication apparatus of Embodiment 4 of the invention will now be described referring to the accompanying drawings.

FIG. 5b shows the rough configuration of the transmitting/receiving circuit for a radiocommunication apparatus of this embodiment, wherein a transmitter matching circuit is disposed between a transmitter amplifier and a changeover switch and a receiver matching circuit is disposed between a receiver low noise amplifier and the changeover switch. This configuration is apparently similar to that of the conventional transmitting/receiving circuit but is different in the following point: The characteristic impedance of a wire extending between an antenna side matching circuit and an antenna is 50 Ω, while that of a wire extending between the antenna side matching circuit and the changeover switch is set to be optimal for the changeover switch in Embodiment 4.

Thus, in this embodiment, the impedance of the wire from the antenna side matching circuit to the changeover switch is set to be optimal for the changeover switch, and in order to attain the optimal impedance, the transmitter matching circuit is provided between the transmitter amplifier and the changeover switch and the receiver matching circuit is provided between the receiver low noise amplifier and the changeover switch.

Now, the significance of setting the impedance of the portion between the antenna side matching circuit and the changeover switch at an optimal value for the changeover switch will be described referring to FIG. 6.

Figure 6:
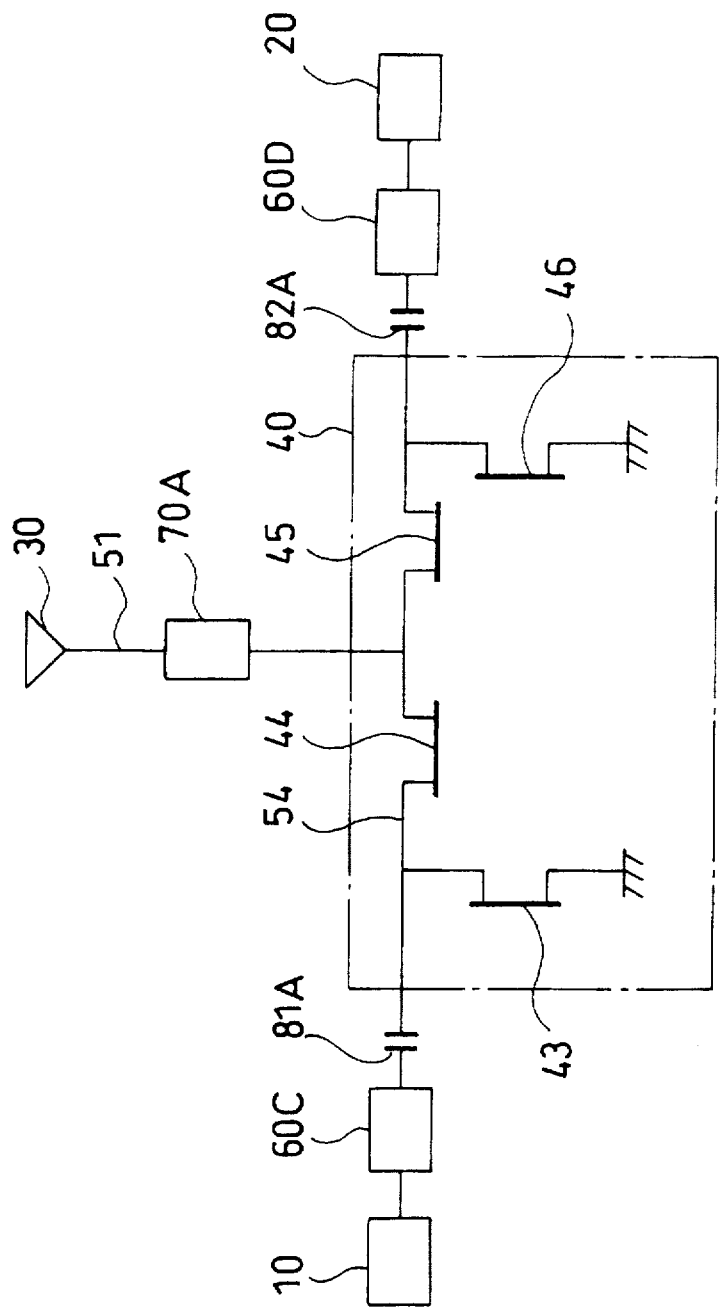
FIG. 6 illustrates optimal characteristic impedance of a changeover switch used in the transmitting/receiving circuit for a radiocommunication apparatus of the fourth embodiment.

The configuration of FIG. 6 comprises a transmitter amplifier 10, a receiver low noise amplifier 20, an antenna 30 for transmitting and receiving a signal, a changeover switch 40, a first wire 51 with characteristic impedance of 50 Ω connecting the antenna 30 to the changeover switch 40, a transmitter matching circuit 60C for matching the output impedance of the transmitter amplifier 10 with the optimal characteristic impedance of the changeover switch 40, a receiver matching circuit 60D for matching the input impedance of the receiver low noise amplifier 20 with the optimal characteristic impedance of the changeover switch 40, an antenna side matching circuit for matching the optimal characteristic impedance of the changeover switch 40 with the characteristic impedance of 50 Ω of the first wire 51, a first coupling capacitance 81A for coupling the transmitter matching circuit 60C and the changeover switch 40, and a second coupling capacitance 82A for coupling the receiver low noise amplifier 20 and the changeover switch 40.

First, in the case where the changeover switch 40 switches on the connection between the transmitter amplifier 10 and the antenna 30, insertion loss of the second FET 44 serving as a transmitter through FET will be examined.

When the insertion loss of the second FET 44 is indicated by L, the following expression 1 holds:

$$L = 10 \times \log((2Z0+Ron)/2 \times Z0)^2 \, dB \quad (1)$$

wherein Z0 indicates the characteristic impedance of a wire 54 on which the second FET 44 is disposed, and Ron indicates the on resistance of the second FET 44.

In the conventional configuration, since the characteristic impedance Z0 of the wire 54 is 50 Ω as that of the first wire 51, the following expression holds:

$$L = 10 \times \log((100+Ron)/100)^2 \, dB$$

Thus, the insertion loss L depends upon the characteristic (i.e., Ron) of the second FET 44.

In contrast, in the configuration of Embodiment 4, since the transmitter matching circuit BOC is provided, the characteristic impedance of the wire 54 can be set to be optimal for the changeover switch 40. Specifically, by increasing the value of Z0, the value of $(2Z0+Ron)/2 \times Z0)^2$ can be decreased, thereby minimizing the insertion loss L of the second FET 44.

Furthermore, when the insertion loss L of the second FET 44 is retained to be constant, the gate width of the second FET 44 can be minimized. Specifically, in expression 1, when the on resistance at the time of Z0=50 Ω is indicated as Ron1, the on resistance at the time of Z0=100 Ω is indicated as Ron2, and the insertion loss L of the second FET 44 is assumed to be constant, the following expression holds:

$$\begin{aligned} L &= 10 \times \log((2 \times 50 + Ron1)/2 \times 50)^2 \\ &= 10 \times \log((2 \times 100 + Ron2)/2 \times 100)^2 \end{aligned}$$

From this expression, Ron2=2×Ron1 is obtained.

Since the on resistance Ron of an FET is inversely proportional to the gate width Wg of the FET, when the on resistance Ron is doubled, the gate width Wg is halved. Specifically, since the changeover switch 40 occupies the largest area in the transmitting/receiving circuit, the area of the changeover switch 40 can be reduced by optimizing the characteristic impedance of the changeover switch 40 so as to decrease the size of the second FET 44 of the changeover switch 40. Thus, even when the areas of the transmitter and receiver matching circuits 6OC and 60D are rather large, the area of the changeover switch 40 can be further decreased, and hence, the entire area of the transmitting/receiving circuit can be made smaller. In this manner, the transmitting/receiving circuit can be made compact.

Furthermore, for the aforementioned reason, when the gate width Wg of the second FET 44 is constant, the insertion loss L of the second FET 44 can be halved.

In this manner, by optimizing the characteristic impedance of the changeover switch 40, the insertion loss of the second FET can be minimized. In addition, by making constant the insertion loss of the second FET, the gate width of the second FET, and in its turn, the area of the second FET can be reduced.

(Embodiment 5)

A transmitting/receiving circuit for a radiocommunication apparatus according to Embodiment 5 of the invention will be described referring to FIG. 7.

Figure 7:
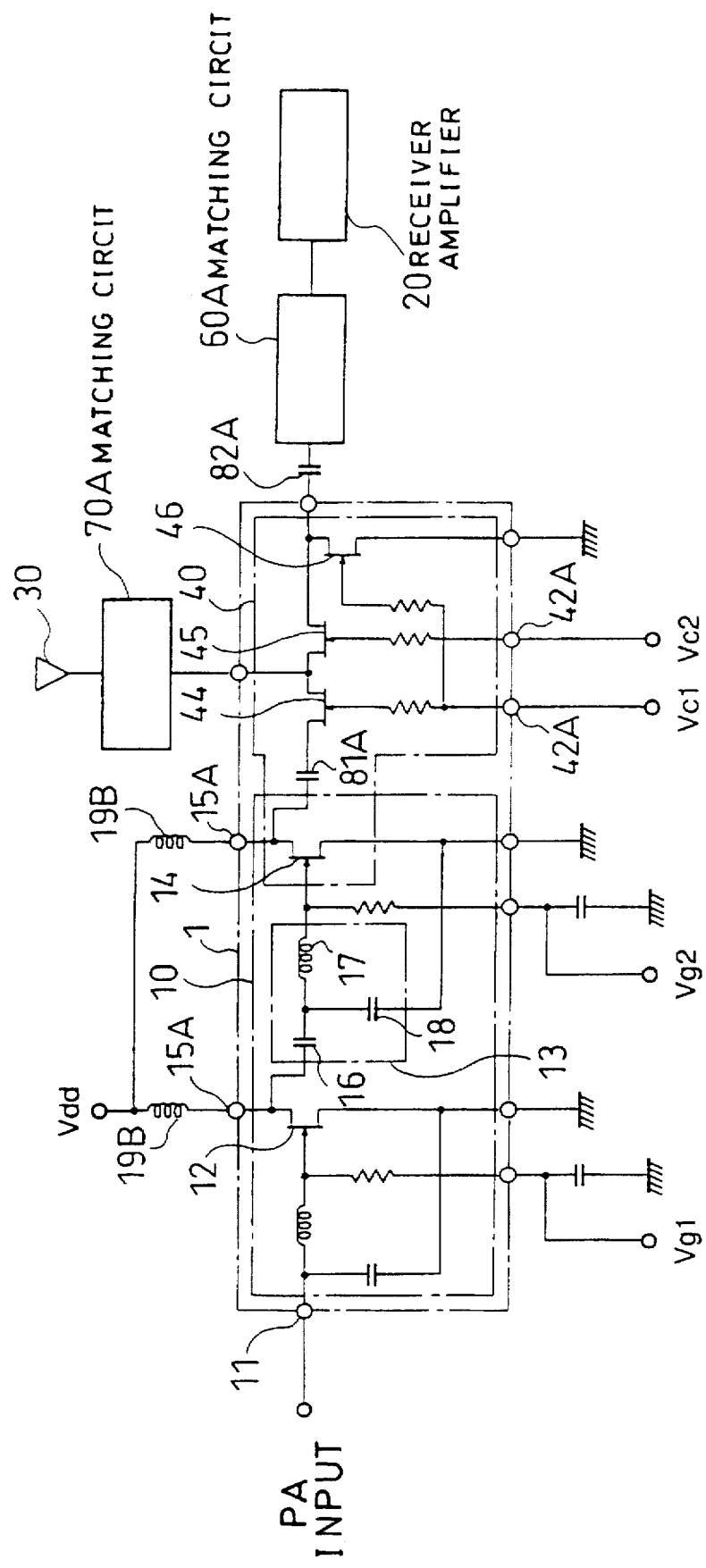
FIG. 7 is a diagram showing a specific configuration of a transmitting/receiving circuit for a radiocommunication apparatus according to a fifth embodiment of the invention.

The transmitting/receiving circuit of FIG. 7 comprises a transmitter amplifier 10, a receiver low noise amplifier 20, an antenna 30 for transmitting and receiving a signal, a changeover switch for switching the connection between the transmitter amplifier 10 and the antenna 30 and the connection between the receiver low noise amplifier 20 and the antenna 30, from one to the other, a receiver matching circuit 60A for matching the input impedance of the receiver low noise amplifier 20 with the output impedance of the transmitter amplifier 10, an antenna side matching circuit 70A for matching the input impedance of the receiver low noise amplifier 20 and the output impedance of the transmitter amplifier 10, which are matched with each other by the receiver matching circuit 60A, with characteristic impedance of 50 Ω of a wire connected to the antenna 30, a first coupling capacitance 81A for directly coupling the output of the transmitter amplifier 10 and the input of the changeover switch 40, and a second coupling capacitance 82A for directly coupling the input of the receiver low noise amplifier 20, which is matched with the output impedance of the transmitter amplifier 10 by the receiver matching circuit 60A, and the output of the changeover switch 40.

The transmitter amplifier 10 and the changeover switch 40 having the above-described configuration are formed on one semiconductor substrate 1.

The transmitting/receiving circuit of Embodiment 5 is characterized in that the changeover switch 40 has an FET 14 disposed at the last stage of the transmitter amplifier 10 and serving as a transmitter shunt FET, a second FET 44 serving as a transmitter through FET, a third FET 45 serving as a receiver through FET, and a fourth FET 46 serving as a receiver shunt FET.

The transmitting operation of this circuit will now be described.

In transmitting a signal, bias voltages Vg1 and Vg2 are respectively applied to the gate terminals of an FET 12 at the first stage and the FET 14 at the last stage of the transmitter amplifier 10, and a supply voltage Vdd is applied to the source terminals of the FETs 12 and 14, thereby amplifying a modulated signal input to the transmitter amplifier 10 up to a sufficiently high level to be supplied to the antenna 30. In the changeover switch 40, control voltages Vc1 and Vc2 are applied to the respective FETs so that those on the transmitter side are turned on and those on the receiver side are turned off. Specifically, for example, the gate terminals of the second FET 44 and the fourth FET 46 are supplied with a voltage of 0 V as the control voltage Vc1, and the gate terminal of the third FET 45 is supplied with a voltage of −5 V as the control voltage Vc2. In this case, since there is no need to operate the receiver low noise amplifier 20, no supply voltage is applied to the receiver low noise amplifier 20.

The receiving operation of the circuit will now be described.

In receiving a signal, a necessary supply voltage is applied to the receiver low noise amplifier 20, thereby allowing the receiver low noise amplifier 20 to amplify a weak signal that has been input from the antenna 30 through the antenna side matching circuit 70A, the changeover switch 40, the second coupling capacitance 82A and the receiver matching circuit 60A to the receiver low noise amplifier 20. It goes without saying that a high frequency signal input to the receiver low noise amplifier 20 at this point has been subjected to impedance matching by the antenna side matching circuit 70A and the receiver matching circuit 60A as is described referring to Embodiment 1. In the changeover switch 40, the control voltages Vc1 and Vc2 and the bias voltage Vg2 are applied to the respective FETs so that those on the transmitter side are turned off and those on the receiver side are turned on. Specifically, for example, the second FET 44 and the fourth FET 46 are supplied with a voltage of −5 V as the control voltage Vc1 and the third FET 45 is supplied with a voltage of 0 V as the control voltage Vc2.

The FET 14 at the last stage of the transmitter amplifier 10 serving as the transmitter shunt FET is supplied with a voltage of 0 V. In receiving a signal, no supply voltage is applied to the transmitter amplifier 10 in order to save power of the battery. Therefore, even when the grounded FET 14 at the last stage is on, no drain current flows therethrough. Thus, a high frequency signal can be grounded. In this manner, the FET 14 at the last stage of the transmitter amplifier 10 can work as the transmitter shunt FET of the changeover switch 40. Specifically, in transmitting a signal, since the FET 14 at the last stage of the transmitter amplifier 10 works as an FET at the last stage of the transmitter amplifier 10, the gate terminal thereof is supplied with the bias voltage Vg2 of, for example, −5 V. In receiving a signal, the FET 14 at the last stage of the transmitter amplifier 10 works as the transmitter shunt FET of the changeover switch 40, and hence, the gate terminal thereof is supplied with the bias voltage Vg2 of, for example, 0 V.

Thus, this embodiment can simplify the configuration of a transmitting/receiving circuit for a radiocommunication apparatus. In addition, when the transmitting/receiving circuit is formed as a semiconductor integrated circuit, the number of the elements contained therein can be decreased, the size of the resultant radiocommunication apparatus can be minimized, the area of the semiconductor integrated circuit can be also minimized, and there is no need to adjust a high frequency signal. This results in a low production cost of the radiocommunication apparatus.

We claim:

1. A transmitting/receiving circuit for a radiocommunication apparatus comprising:

a transmitter amplifier for amplifying an input transmission signal and outputting the amplified transmission signal;

a receiver amplifier for amplifying an input received signal and outputting the amplified received signal;

a changeover switch having an antenna side input/output terminal through which the transmission signal is output to an antenna via a wire having prescribed characteristic impedance and the received signal is input from the antenna via the wire, for switching a first connection state for outputting the transmission signal received from the transmitter amplifier via no matching circuit to the antenna side input/output terminal and a second connection state for outputting the received signal received through the antenna side input/output terminal to the receiver amplifier, from one to the other;

a receiver matching circuit interposed between the changeover switch and the receiver amplifier for matching input impedance of the receiver amplifier with output impedance of the transmitter amplifier; and an antenna side matching circuit interposed between the wire and the changeover switch for matching the characteristic impedance of the wire with the output impedance of the transmitter amplifier;

wherein the changeover switch has a transmitter through FET and a transmitter shunt FET connected in series to each other and a receiver through FET and a receiver shunt FET connected in series to each other, the transmitter amplifier has at least one amplifier FET for amplifying the input transmission signal, and the amplifier FET at a last stage of the transmitter amplifier also works as the transmitter shunt FET of the changeover switch.

2. A transmitting/receiving circuit for a radiocommunication apparatus comprising:

a transmitter amplifier for amplifying an input transmission signal and outputting the amplified transmission signal;

a receiver amplifier for amplifying an input received signal and outputting the amplified received signal;

a changeover switch having an antenna side input/output terminal through which the transmission signal is output to an antenna via a wire having prescribed characteristic impedance and the received signal is input from the antenna via the wire, for switching a first connection state for outputting the transmission signal received from the transmitter amplifier to the antenna side input/output terminal and a second connection state for outputting the received signal received through the antenna side input/output terminal to the receiver amplifier, from one to the other;

a transmitter matching circuit interposed between the transmitter amplifier and the changeover switch for matching output impedance of the transmitter amplifier with input impedance of the receiver amplifier; and an antenna side matching circuit interposed between the wire and the changeover switch for matching the characteristic impedance of the wire with the input impedance of the receiver amplifier.

3. A transmitting/receiving circuit for a radiocommunication apparatus comprising:

a transmitter amplifier for amplifying an input transmission signal and outputting the amplified transmission signal;

a receiver amplifier for amplifying an input received signal and outputting the amplified received signal;

a changeover switch having an antenna side input/output terminal through which the transmission signal is output to an antenna via a wire having prescribed characteristic impedance and the received signal is input from the antenna via the wire, for switching a first connection state for outputting the transmission signal received from the transmitter amplifier to the antenna side input/output terminal and a second connection state for outputting the received signal received through the antenna side input/output terminal to the receiver amplifier, from one to the other;

a transmitter matching circuit interposed between the transmitter amplifier and the changeover switch for matching output impedance of the transmitter amplifier with optimal characteristic impedance of the changeover switch;

a receiver matching circuit interposed between the changeover switch and the receiver amplifier for matching input impedance of the receiver amplifier with the optimal characteristic impedance of the changeover switch; and an antenna side matching circuit interposed between the wire and the changeover switch for matching the characteristic impedance of the wire with the optimal characteristic impedance of the changeover switch.

4. A transmitting/receiving circuit for a radiocommunication apparatus comprising:

a transmitter amplifier having at least one amplifier FET for amplifying an input transmission signal;

a receiver amplifier for amplifying an input received signal and outputting the amplified received signal; and a changeover switch having an antenna input/output terminal through which the transmission signal is output to an antenna and the received signal is input from the antenna, a transmitter through FET and a transmitter shunt FET connected in series to each other, and a receiver through FET and a receiver shunt FET connected in series to each other, for switching a first connection state for outputting the transmission signal received from the transmitter amplifier to the antenna side input/output terminal and a second connection state for outputting the received signal received through the antenna side input/output terminal to the receiver amplifier, from one to the other, wherein the amplifier FET at a last stage of the transmitter amplifier works also as the transmitter shunt FET of the changeover switch.

5. A semiconductor integrated circuit device comprising:

a semiconductor substrate;

a transmitter amplifier formed on the semiconductor substrate for amplifying an input transmission signal and outputting the amplified transmission signal;

a receiver amplifier formed on the semiconductor substrate for amplifying an input received signal and outputting the amplified received signal;

a changeover switch formed on the semiconductor substrate having an antenna side input/output terminal through which the transmission signal is output to an antenna via a wire having prescribed characteristic impedance and an antenna side matching circuit for matching the characteristic impedance of the wire with output impedance of the transmitter amplifier and the received signal is input from the antenna via the wire and the antenna side matching circuit, for switching a first connection state for outputting the transmission signal received from the transmitter amplifier via no matching circuit to the antenna side input/output terminal and a second connection state for outputting the received signal received through the antenna side input/output terminal to the receiver amplifier, from one to the other; and a receiver matching circuit formed on the semiconductor substrate and interposed between the receiver amplifier and the changeover switch for matching input impedance of the receiver amplifier with the output impedance of the transmitter amplifier:

wherein the changeover switch has a transmitter through FET and a transmitter shunt FET connected in series to each other and a receiver through FET and a receiver shunt FET connected in series to each other, the transmitter amplifier has at least one amplifier FET for amplifying the input transmission signal; and the amplifier FET at a last stage of the transmitter amplifier works also as the transmitter shunt FET of the changeover switch.

6. A semiconductor integrated circuit device comprising:

a semiconductor substrate;

a transmitter amplifier formed on the semiconductor substrate and having at least one amplifier FET for amplifying an input transmission signal; and a changeover switch formed on the semiconductor substrate and having an antenna input/output terminal through which the transmission signal is output to an antenna and a received signal is input from the antenna, a transmitter through FET and a transmitter shunt FET connected in series to each other, a receiver through FET and a receiver shunt FET connected in series to each other, for switching a first connection state for outputting the transmission signal received from the transmitter amplifier to the antenna side input/output terminal and a second connection state for outputting the received signal received through the antenna side input/output terminal to the receiver amplifier, from one to the other, wherein the amplifier FET at a last stage of the transmitter amplifier works also as the transmitter shunt FET of the changeover switch.

7. A radiocommunication apparatus comprising:

an antenna;

a wire connected to the antenna and having prescribed characteristic impedance;

a transmitter amplifier for amplifying an input transmission signal and outputting the amplified transmission signal;

a receiver amplifier for amplifying an input received signal and outputting the amplified received signal;

a changeover switch having an antenna side input/output terminal through which the transmission signal is output to the antenna via the wire and the received signal is input from the antenna via the wire, for switching a first connection state for outputting the transmission signal received from the transmitter amplifier to the antenna side input/output terminal and a second connection state for outputting the received signal received through the antenna side input/output terminal to the receiver amplifier via no matching circuit, from one to the other;

a transmitter matching circuit interposed between the transmitter amplifier and the changeover switch for matching output impedance of the transmitter amplifier with input impedance of the receiver amplifier; and an antenna side matching circuit interposed between the wire and the changeover switch for matching the characteristic impedance of the wire with the input impedance of the receiver amplifier.

8. A radiocommunication apparatus comprising:

an antenna;

a wire connected to the antenna and having prescribed characteristic impedance;

a transmitter amplifier for amplifying an input transmission signal and outputting the amplified transmission signal;

a receiver amplifier for amplifying an input received signal and outputting the amplified received signal;

a changeover switch having an antenna side input/output terminal through which the transmission signal is output to the antenna via the wire and the received signal is input from the antenna via the wire, for switching a first connection state for outputting the transmission signal received from the transmitter amplifier to the antenna side input/output terminal and a second connection state for outputting the received signal received through the antenna side input/output terminal to the receiver amplifier, from one to the other;

a transmitter matching circuit interposed between the transmitter amplifier and the changeover switch for matching output impedance of the transmitter amplifier with optimal characteristic impedance of the changeover switch;

a receiver matching circuit interposed between the changeover switch and the receiver amplifier for matching input impedance of the receiver amplifier with the optimal characteristic impedance of the changeover switch; and an antenna side matching circuit interposed between the wire and the changeover switch for matching the characteristic impedance of the wire with the optimal characteristic impedance of the changeover switch.

* * * * *

UNITED STATES PATENT AND TRADEMARK OFFICE
CERTIFICATE OF CORRECTION

PATENT NO. : 5,784,687
DATED : July 21, 1998
INVENTOR(S) : Itoh et al.

It is certified that error appears in the above-identified patent and that said Letters Patent is hereby corrected as shown below:

On the cover page:

In the Foreign Application Priority Data section, change "6-20573" to --6-205073--.

Signed and Sealed this

Twenty-third Day of May, 2000

Attest:

Q. TODD DICKINSON

Attesting Officer

Director of Patents and Trademarks